United States Patent [19]

Jensen

[11] Patent Number: 4,629,243
[45] Date of Patent: Dec. 16, 1986

[54] HINGE ADAPTER KIT FOR OPEN-BED VEHICULAR ENCLOSURES

[76] Inventor: John D. Jensen, RR #1, Box 213, Tomah, Wis. 54660

[21] Appl. No.: 718,749

[22] Filed: Apr. 1, 1985

[51] Int. Cl.⁴ .................................................. B60P 7/02
[52] U.S. Cl. ...................................... 296/100; 16/262; 16/229; 16/382; 16/386
[58] Field of Search ................... 16/229, 261–263, 16/270, 319, 382, 386; 296/100

[56] References Cited

U.S. PATENT DOCUMENTS

| | | | |
|---|---|---|---|
| 934,244 | 9/1909 | Veling | 296/100 |
| 2,886,375 | 5/1959 | Crawford | 296/100 |
| 3,508,787 | 4/1970 | Strong et al. | 296/100 |
| 3,704,039 | 11/1972 | Dean | 296/100 |
| 3,768,858 | 10/1973 | Boismier | 296/100 |
| 4,284,303 | 8/1981 | Hather | 16/261 X |

FOREIGN PATENT DOCUMENTS 73910 10/1917 Austria ................... 16/229

Primary Examiner—Donald R. Schran
Assistant Examiner—James L. Wolfe
Attorney, Agent, or Firm—M. Paul Hendrickson

[57] ABSTRACT

There is provided a hinge adapter kit adapted to be secured to the sidewalls of an enclosure or cover and an open bedded vehicle. The secured assemblies (4) provide selective access to either bed side while permitting ease of installation or removal of the enclosure therefrom. Each enclosure assembly (2) is provided with at least one complemental shaft retaining member. Each bed sidewall assembly (2) is equipped with a slidably, mounted shaft assembly composed of at least two shaft sub-units in longitudinal alignment and spaced apart so as to vertically clear or not clear the complemental shaft retaining members when the shaft assembly is respectively adjusted to an unlatching and latching position. A shaft connector rigidly secures the shaft sub-units. Latching secures the enclosure to the bed while also providing a hinging system formed by the mounted shaft housed within the complemental retaining member upon which the enclosure axially pivots.

11 Claims, 10 Drawing Figures

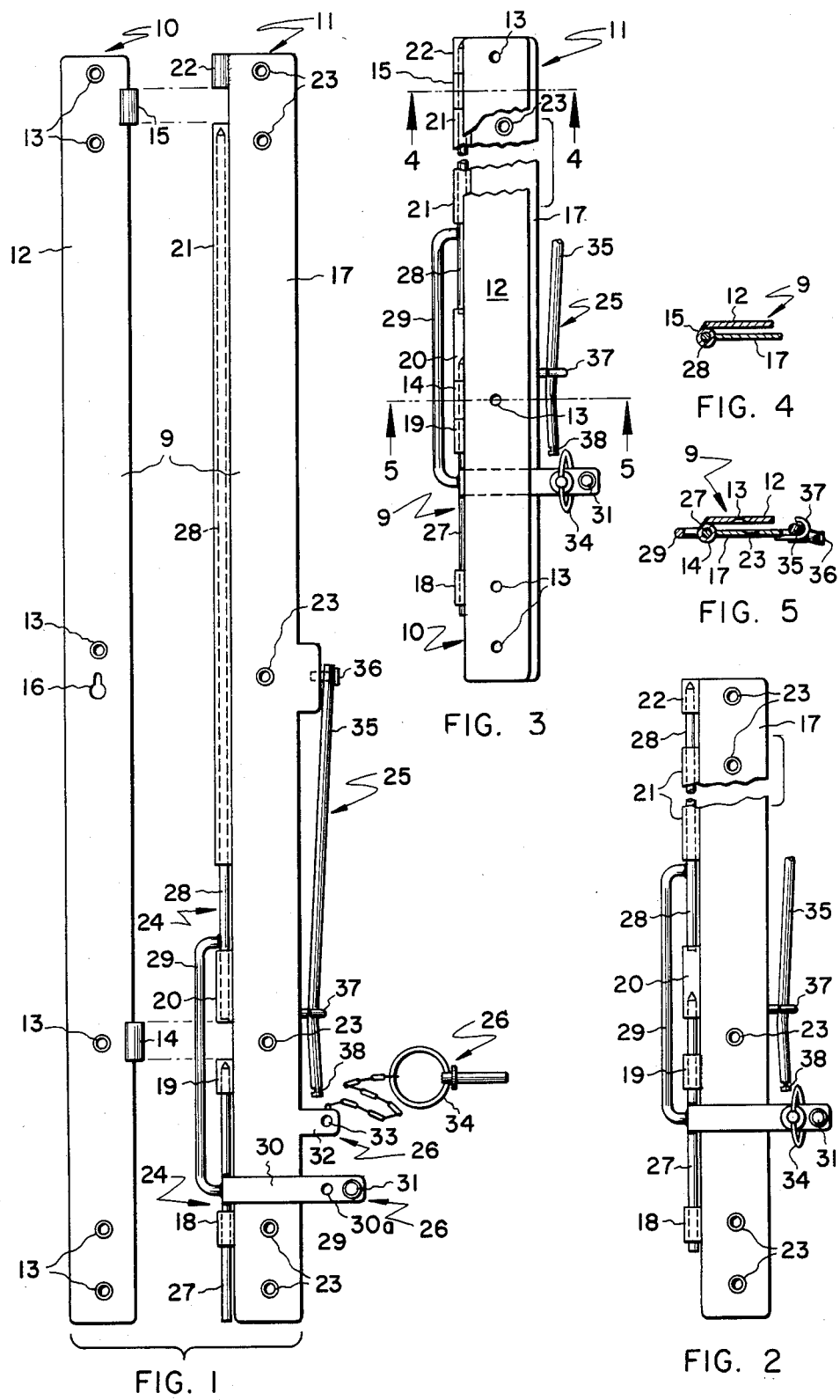

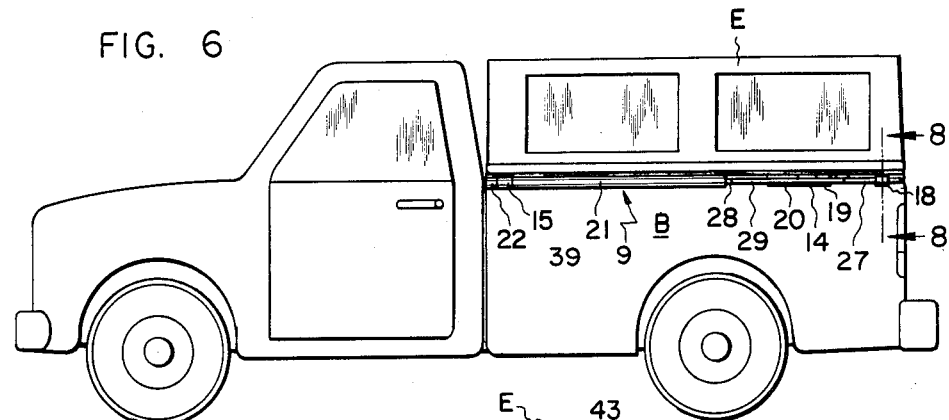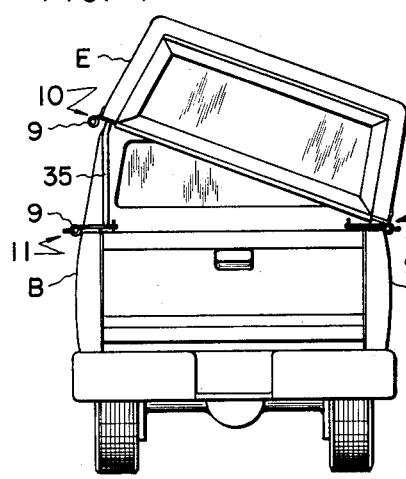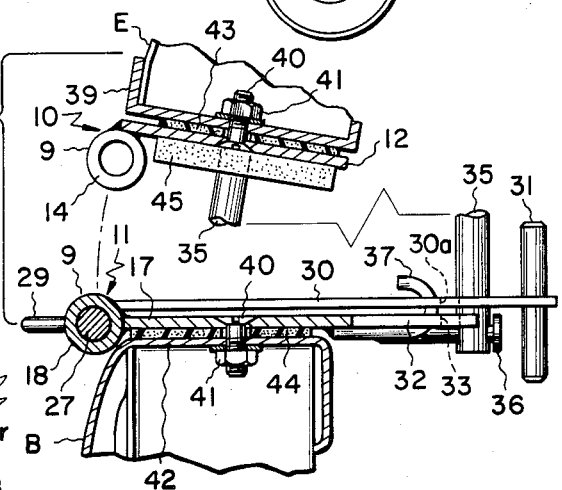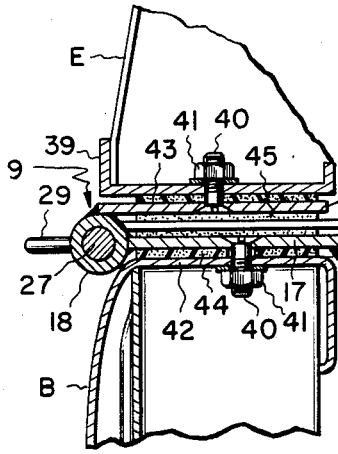

HINGE ADAPTER KIT FOR OPEN-BED VEHICULAR ENCLOSURES

FIELD OF THE INVENTION

The present invention relates to a mountable hinge kit and more particularily to the hinge adapter kit for open-bed vehicular enclosures which kit permits selective access to either side of the bed with means for readily installing or removing the enclosure therefrom.

BACKGROUND OF THE INVENTION

Enclosures or covers for open-bed vehicles, such as camper tops for pick-up trucks, are well known and have become increasingly popular. Camper tops are generally categorized as being of the walk-in type or of the low profile type.

The walk-in tops usually provide adequate head room to accommodate an average sized person in an up-right position. Access to the truck bed is generally through a door or opening at the rear of the pick-up truck. Wind resistance, excessive bulkiness and weight, poor roadability and bed accessibility, difficulties in removing and installing, adverse fuel consumption, etc., are included amongst the major disadvantages which have substantially diminished the popularity of the walk-in type camper tops.

Low profile camper tops typically have a roof-line approximating the height of the passenger cab. They have become increasingly popular since their design and construction alleviates many of the problems attendant to the walk-in camper tops. Unfortunately, the head room and interior accessibility particularily in the foremost areas of the bed are severly limited by the low profile design.

Open bed vehicles such as pick-up truck beds, typically comprise a pair of upwardly extending sidewalls, a front wall (which may be a separate partition or a part of the outside rear wall of the passenger cabin) and a rear hitch or gate which forms the back wall of the bed. Camper tops are essentially a vertical extension of the bed walls with a roof or top covering. The camper top backwall is typically equipped with a hinging, and locking mechanism. Access to the vehicle bed is most commonly achieved by upwardly swinging the back wall of the camper and the downward swinging of the end gate.

The earlier versions of the camper tops were rigidly secured (by bolts, clamps, etc.) to the bed of the pick-up vehicle. Access to the pick-up bed was severly limited by single entry through the back wall.

The art has proposed numerous devices to improve upon access. Numerous devices affording selective access to open beds have been proposed. For example, U.S. Pat. No. 4,101,162 by Koehm proposed a vertically swingable camper shell. The shell relies upon a custom made and complicated hinging mechanism positioned near the passenger cab. This device improves upon the rear accessibility to but forward accessibility remains limited.

Other devices, embodying a horizontally swingable camper top design, afford access to the side of the pick-up bed. Included amongst such devices is a detachable camper top disclosed in U.S. Pat. No. 2,886,375 by Crawford. The Crawford patent relies upon cam hooking members affixed to axially rotatable shafts rigidly secured to the sidewalls of the bed. The custom made camper top sidewalls are fitted with matching rollers for engaging the cam hooking members. The cam hooking members may be disengaged from the matching rollers by rotating the shaft. The camper top may then be pivoted upon the engaged cam hooking members and rollers on the opposite side of the bed. The Crawford device is expensive, and structurally complicated and requires custom manufacturing of the roller system into the camper top shell.

Another variation of a horizontally swingable hinging mechanism may be found in U.S. Pat. No. 3,180,674 by Pounds. The Pounds device contains post-carrying plates which fit into the stake pockets. These plates are hinged to the sidewalls of the camper top. Another horizontally hinged device for a pick-up vehicle is disclosed in U.S. Pat. No. 4,142,760 by Dockery, et al. The Dockery, et al., device comprises a base member equipped with a hinging mechanism similar to a conventional doorway hinges. Similar to the hinging effect of a doorway, horizontal swingability of the bed cover is limited to hinge placement.

A still further hinging device is disclosed in U.S. Pat. No. 4,284,303 by Hather. The Hather hinging mechanism comprises a plurality of slotted eyelets affixed to the bed sidewall with a plurality of complementary mating slots in a rotatable shaft affixed to the camper top sidewall. Access to either side of the bed may be achieved by rotating the shaft on the desired side of access so that the shaft slots align with the corresponding eyelets. This permits the shaft to be lifted through the eyelet and the camper cover may then be swung upon the hinge formed by the engaged eyelets and shaft of the opposite sidewall.

A hinging device for converting a pick-up truck bed into a flat bed is disclosed in U.S. Pat. No. 4,181,351 by Spanke. The Spanke device entails a plurality of eyelet members secured to support rail fo the bed and a plurality of pins which when inserted into the eyelets, provide means for securing and/or swinging the bed upon the axis formed by the eyelet and the pin insertions.

As evidenced by the aforementioned patented literature, numerous hinging devices for achieving selective access to the bed have been proposed. Each proposal proports to overcome certain prior art deficiencies. Many of the proposed devices embody complex and bulky structural components which are impractical from both a manufacturing and field usage view point. Others involve complicated and multi-staged procedural steps for inserting, removing, or achieving selective access to the bed. A majority of the proposed hinging devices necessitate substantial alterations to the design and construction of the camper top and/or bed. Such proposals generally necessitate tailoring or custom manufacturing of the camper shell so as to fit the hinging device rather than a hinging mechanism which may be readily adapted to the commonly available, mass produced camper tops or enclosure shells of the trade. Such proposals cannot be reconciled with the long-standing industrial and consumer objectives of providing a high quality, mass unit manufacture at a low cost. Certain proposals have relied upon externally exposed components and a separate key locking means as opposed to a device which would be compatable with the conventional single key-locking system of the presently available camper tops. A hinging mechanism which would permit disengagement within the internal confines of the pick-up bed and rely upon the cam camper top key-locking system would represent a significant improvement.

SUMMARY OF THE INVENTION

The present invention alleviates the aforementioned prior art problems. The present invention affords a low cost hinge adapter kit for conventional open beds and enclosures therefore. The kit readily fits conventional truck beds and enclosures (e.g. camper tops) without necessitating costly modifications or design changes.

The hinge adapter kit typically comprises a pair sidewall assemblies for the left and right bed sidewall and a pair (right and left) of enclosure support assembly units. Each sidewall assembly is equipped with a longitudinally slideable shaft; each of which is comprised of two or more longitudinally aligned shaft sub-units with a cut-out portion or spacing therebetween. Each enclosure support assembly unit is provided with a shaft complemental retaining member of a longitudinal length at least equivalent to the spacing between the shaft sub-units. The complemental shaft retaining members engage the longitudinally slideable shaft when the shaft is in the latching position while affording clearance and passage of the separated shaft sub-units through the complemental retaining members when the shaft is adjusted to the unlatching position.

Selective access to either side of the vehicle bed may be achieved by slidably adjusting the shaft on the desired side of entry to the unlatching position while pivoting the camper top upon the latched sidewall assembly and enclosure support assembly opposite therefrom. Removal of the enclosure from the vehicular bed may be simply accomplished by slidably adjusting both shafts to the unlatching position and removing the enclosure from the bed. The enclosure may be easily placed and secured upon the bed by lifting the top upon the bed with both of the shafts adjusted to the unlatching position and thereafter sliding of both shafts into the latched position to secure the enclosure to the bed.

The hinge adapter kit is suitably provided with an internal latching system which secures and prevents the slideable shaft from moving into the unlatching position. This latching system may embody an internal design which is totally confined within the enclosure so that the conventional back wall lock of the enclosure provides a common lock therefor.

The design of the hinge adapter kit permits the latching and unlatching to be conveniently accomplished from the rear of the vehicle. Each side of the kit is advantageously equipped with a brace or other mechanical means for supporting and retaining the enclosure in an upright position for convenient access to the bed.

BRIEF DESCRIPTION OF THE DRAWINGS

FIG. 1 is a bottom view of the left enclosure support assembly and a top view of the left sidewall base assembly of the hinge kit and shows the shaft assembly in the unlatched position.

FIG. 2 is a fragmentary top view of the left sidewall base assembly of FIG. 1 illustrating the shaft assembly in the latched position.

FIG. 3 is a fragmentary top view illustrating the hinge adapter kit in the closed and latched position with the left enclosure support assembly resting upon the sidewall base assembly unit.

FIG. 4 is a sectional view taken along line 4—4 of FIG. 3.

FIG. 5 is a sectional view taken along line 5—5 of FIG. 3.

FIG. 6 is a side view of a typical pick-up truck showing the enclosure in the closed position.

FIG. 7 is a rear view of a typical pick-up truck with the enclosure raised to permit access from the left side of the pick-up truck.

FIG. 8 is a fragmentary rear sectional view taken along line 8—8 of FIG. 6 depicting the assembled hinge adapter kit in the closed and latched position.

FIG. 9 is a sectional view taken at line 8—8 of FIG. 6 depicting the assembled left hinge assembly with the enclosure being in the open position as illustrated in FIG. 7.

FIG. 10 is a fragmentary rear sectional view of the assembled right hinge assembly taken along line 8—8 of FIG. 6 with the enclosure in the opened position as shown in FIG. 7.

DETAILED DESCRIPTION OF THE INVENTION

The embodiments of the present invention may be more fully appreciated by referring to the drawings. The hinge adapter kit comprises a left hinge assembly and a right hinge assembly which are adapted to be secured to the corresponding sidewalls of the enclosure and vehicle bed. Each hinge assembly side includes an enclosure support unit and a sidewall bed unit. FIG. 1 provides an illustration of the left hinge assembly 9 and reveals a bottom view of the left enclosure support unit (generally designated as 10) and a top view of the left sidewall bed unit which is generally numerically designated by 11. The enclosure support unit 10 (as illustrated in FIG. 1) of the left assembly 9 comprises a support rail 12 with a plurality of centrally disposed apertures 13 being suitably spaced along rail 12 for mounting and securing (e.g. bolting, riveting, screws, etc.) the enclosure unit 10 to the enclosure base (not shown) one or more complemental retaining members (14 and 15) of a suitable construction for housing a longitudinal slidable shaft. The complemental retaining members 14 and 15 are longitudinally aligned with one another and rigidly affixed (e.g. welding, bolting, etc.) to rail 12 or manufactured in such a manner so as to become an integral part of the rail 12 construction. The left support unit 10 is also advantageously provided with a brace receiving and retaining aperture 16 which operatively engages a slotted support art more fully described below.

Structural support for the left sidewall unit 11 is provided by a left sidewall rail 17 to which there are rigidly secured a plurality of sidewall shaft retaining members respectively designated as 18, 19, 20, 21 and 22. Rail 17 may be likewise provided a plurality of securing apertures (generally designated as numerical 23) for securing the left sidewall assembly 11 onto the left sidewall of the bed (not shown).

The left sidewall unit 10 is further equipped with a slidable shaft assembly generally designated as 24, which in connjunction with the complemental retaining members 14 and 15 of support unit 10 and mating retaining members 18-22 of sidewall unit 11 provide the means for obtaining selective access to the left side of the bed as well as a hinging system when right side access is desired. The shaft assembly 24 in conjunction with complemental retaining members 14 and 15 and retaining members 18-22 also provides a system whereby the left enclosure assembly 10 may be secured or removed from engagement to the left sidewall unit 11.

The left sidewall unit 11 is also advantageously fitted with an arm brace assembly (generally designated by numerical 25). There is further advantageously provided a means for latching (generally designated in FIG. 1 as 26) or immobilizing the shaft assembly 24 from movement.

Adjacent retaining members 19 and 20 along with adjacent retaining members 21 and 22 of assembly 11 respectively serve as receiving sites or recesses for complemental shaft retaining members 14 and 15. Each of the complemental retaining member (14 and 15) are adapted to longitudinally fit into the recessed portions of the corresponding sidewall retaining members and to receive and house therein, the shafted portions of shaft assembly 24.

One or more complemental shaft retaining members may be incorporated into the left hinge assembly 9 design. The most appropriate number of mating retaining members depends largely upon the structural strength needed to secure and to hinge the enclosure to the vehicle bed. A single complemental retaining member in combination with a pair of sidewall retaining members (preferably mated so as to receive therein a complemental member) will generally be sufficient for relatively small and light weight enclosures such as for motorcycle trailer, etc., while two or more complemental retaining members may be required for a more bulky, heavier and larger enclosures.

The left shaft assembly 24 is designed to be housed and longitudinally move within the shaft retaining members (19–22) of the left sidewall assembly unit 11, as well as into and out of the left complemental shaft retaining members 14 and 15 of enclosure support assembly unit 10. The broken lines in FIG. 1, as well as those in FIGS. 2 and 3, outline the shaft portion housed within complemental retaining members 14 and 15 and retaining members 18–22. Left shaft assembly 24 (as shown in FIG. 1) is comprised of two shaft sub-units (27 and 28) which are longitudinally spaced apart to provide an internally disposed discontinuous shaft portion of a sufficient length so as to permit complemental shaft retaining member 14 to freely pass through the discontinuous shaft portion of shaft assembly 24 when the slidable shaft assembly is adjusted to the unlatching position. Generally, the number of shaft sub-units required by any given shaft assembly will be equivalent to the number of complemental retaining members. Shaft sub-unit 28 should have sufficient length to pass through complemental retaining member 15 and engage shaft retaining member 22 when shaft assembly 24 is adjusted to the latching position. Conversely, shaft sub-unit 28 should be short enough to permit complemental retaining member 15 to freely clear shaft 28 when the shaft assembly is adjusted to the unlatching position.

Shaft sub-units 27 and 28 are rigidly secured to and positioned in longitudinal alignment with one another via left shaft connector 29. The left shaft connector 29 is designed and constructed to provide sufficient clearance between shaft sub-units 27 and 28 to permit the discontinuous portion therebetween to longitudinally and freely move from a position of alignment and/or non-alignment (latching) with the corresponding complemental (unlatching) member 14. The left shaft connector 29 as depicted in FIG. 1 forms a bracket bridging retaining members 19 and 20.

Retaining member 18 may be conveniently positioned along sidewall rail 17 so as to serve as a stop against further backward movement of shaft assembly 24. Thus shaft assembly 24 may be pulled backwards until shaft connector 27 abutts retaining member 8 which conveniently stops the shaft assembly 24 at the unlatching position. Retaining member 21 in conjunction with shaft connector 29, may also serve as a stop against further forward movement of the shaft assembly 24. Retaining member 21 is conveniently positioned on the sidewall rail to coincide to the latching position. Pursuant to this embodiment of the invention, the operator need only pull shaft assembly 24 to the stop provided by retaining member 18 for unlatching the hinge assembly 9 and simply push it forward until shaft connector 29 is stopped by retaining member 21 to place the shaft assembly 24 in the latching position.

The left enclosure support rail 12 and sidewall rail 17 will advantageously dimensionally match the width and length of the enclosure bases and bed sidewalls. The sidewall of pick-up beds and camper tops may vary considerably in length (e.g. 4–12 feet) but usually range from about six to about eight feet with most sidewalls widths usually measuring from about one to about six inches.

The hinge assembly 9 may be constructed of a variety of materials which provide the necessary structural strength. High impart plastics and/or metallic substances, especially flat metals (e.g. steel, aluminum, etc.) of a thickness ranging from about 1/32" to about ⅜" will generally provide sufficient structural strength for the supporting rail 12 and sidewall rail 17. Slideably mounted shaft sub-units 27 and 28 as well as the retaining members (14 and 15, and 18–22) may likewise be constructed of a variety of materials, the construction of which will depend largely upon the structural strength needed for any given enclosure or camper top. Tubular materials such as plastic or steel tubes having an internal diameter measuring from approximately ¼" to about ½" may be typically used to construct shaft retaining members 18–22 and the complemental retaining members 14 and 15. The slidably mounted shaft sub-unit 27 and 28 may be similarily constructed (e.g. solid rods, etc.) of a variety of materials (e.g. metals plastics, etc.) of sufficient structural strength and outer diameter to be slidably move (preferable freely but snuggly) within retaining members 18–22 and complemental retaining members 14 and 15. The sidewall assembly retaining members 18–22 and enclosure complemental retaining members 14 and 15 may be respectively welded or otherwise secured in longitudinal alignment onto rails 14 and 17. Shaft connector 29 may be constructed from a steel rod or other suitable construction materials and secured by welding or other securing means onto shaft sub-units 27 and 28 in such a manner so as longitudinally align and provide the necessary clearance for complemental retaining member 14.

FIG. 1 further illustrates suitable means for latching the shaft assembly 24. The illustrated means for latching (generally designated by numerical 26) the shaft assembly shows a handle base 30 rigidly attached to the shaft sub-unit 27 with a centerally disposed handle aperture 30a and a handle projection 31 affixed and projecting both the upper and lower sides of handle base 29. Rail 17 of the left sidewall assembly 11 is likewise rigidly fitted with a tap projection 32 and a centrally disposed tap aperture 33. The tap aperture 33 and handle aperture 30a are positioned so as to be in vertical alignment with one another when the shaft assembly 24 is moved forward to the latching position. A pin, such as Lynch pin 34, may then be inserted into the vertically aligned handle and tap apertures (30a and 33) to secure the shaft assembly 24 against undersidable movement.

Sidewall assembly unit 11 may also be advantageously provided with a bracing assembly generally designated as 25. The components of the bracing system (as illustrated by FIG. 1) include a supporting arm 35, (e.g. rod, etc.) mounted upon support post 36 (e.g. pin, bolt, flat headed rivot, etc.) which permits pivotal movement of arm 35 and an arm bracket 37 for securing arm 35 when not in use. The distal portion of arm 35 may be suitably provided with a slotted engaging member 38 which fits into and engages the corresponding female aperture 16 of the left enclosure assembly 10. The matching slots prevent upward (e.g. wind) and downward (e.g. gravitational) movement of the enclosure. The bracing assembly 24 provides a convenient means for maintaining the enclosure in an open position for ease of access to the bed body. The right enclosure assembly and the right sidewall assembly unit of the right hinge assembly represent a mirror image of the aforementioned described left side hinge assembly 9.

FIG. 2 is a fragmentary top view of the left sidewall assembly 11 revealing the shaft assembly 24 in the latched position. FIG. 2 further illustrates the insertion of Lynch pin 34 into handle aperture 30a with the ring portion thereof being flipped clockwise approximately 180° degrees over the handle post 31 to latch and secure the shaft assembly 24 from further movement. The shaft assembly 24 has been slide forward (upwardly in FIG. 2) so that the distal portion of the shaft sub-unit 28 (broken line outline) is housed within retaining member 22. Shaft sub-unit 28 is also shown depicted as bridging the space between retaining members 21 and 22 within which complemental retaining member 15 (not shown) of the left enclosure assembly unit 10 will longitudinally align and operatively house shaft sub-unit 28. Similarily, the continuous portion or solid shaft portion of shaft sub-unit 27 is illustrated in FIG. 2 as bridging and being housed within adjacent retaining members 19 and 20. The solid shaft portion therebetween of shaft sub-unit 27 is adapted to operatively engage the corresponding complemental member 14 for purposes of securing the enclosure assembly to sidewall unit 11 as well as providing a hinging system for axially pivoting the enclosure upon the left sidewall assemblies when access to the right side of the bed is desired.

FIG. 3 is a fragmentary top view of the left enclosure support assembly unit 10 superposed upon the sidewall assembly unit 11. Portions of the sidewall assembly unit 11 are revealed along the right margin of the enclosure support assembly unit 10 and in the vicinity of the fragmentary break. The complemental retaining members 14 and 15 are respectively inserted within the recessed portions between retaining members 19 and 20 and 21 and 22 of the sidewall assembly unit 11 with the shaft assembly 24 being moved forward to the latching position and secured via Lynch pin 34 as described above. The latching position of FIG. 3 illustrates the cooperative relationship between the two left assembly units for securing and latching the enclosure to the sidewall onto a top rail of a bed and the hinging system afforded thereby.

FIG. 4 represents a sectional side view of the assembled left hinge assembly 9 taken along line 4—4 of FIG. 3 showing the assembled relationship of sidewall assembly unit 11 and left enclosure support unit 10 with shaft sub-unit 28 being housed within complemental retaining member 15.

FIG. 5 similarily reveals a cross sectional side view of the assembled left hinge assembly 9 taken along line 5—5 and showing the left enclosure support unit 10 and the sidewall assembly unit 11. The cross sectional view of the shaft connector 29, complemental retaining member 14, rail 12 of the left enclosure assembly unit 10 as well as rail 17, shaft connector 29, shaft sub-unit 27, the arm bracket 37 for supporting arm 35 and slotted engaging member 39 of the left sidewall assembly unit 11 are depicted in FIG. 5.

FIG. 6 illustrates a side view of a typical pick-up truck having an open bed (generally designated as B) with camper top (generally designated as E) secured to the bed by the left hinge assembly 9 of this invention. The left enclosure support unit 10 and the left sidewall assembly unit 11 have been enlarged for illustrative purposes. The enlarged complemental shaft retaining members 14 and 15 are in longitudinal alignment with retaining members 22, 21, 20, 19, and 18. The shaft sub-units (27 and 28) have been longitudinally moved forward so as to engage and secure the complemental retaining members 14 and 15 and thereby securing the left enclosure support unit 10 to the left sidewall assembly 11. The secured complemental retaining members (14 and 15) and retaining members (18, 19, 20, 21 and 22 in conjunction with the housed shaft sub-units (27 and 28) therein provide the hinging mechanism for left hinge assembly 9.

FIG. 7 depicts a rear view of a typical pick-up truck with the enclosure E raised for left sided access to the pick-up bed B. Supporting arm 35 extending upwardly from left sidewall assembly unit 10 supports the left enclosure support unit 10 and secured enclosure E in the open position for left side bed access while the unlatched right hinge assembly 9r provides the hinge therefor.

Selective access to the left side of the bed has been achieved by pulling backward the left shaft assembly 24 to the unlatching position. Shaft connector 29 permits the simultaneous movement of the shaft sub-units (27 and 28) into the latching (e.g. see FIG. 1) or unlatching (e.g. see FIGS. 2 and 3) position from the bed B rear. When the left shaft assembly has been adjusted to the unlatching positon, the left complemental retaining members 14 and 15 are provided with sufficient clearance to clear shaft sub-units 27 and 28. This permits the left side of the enclosure E to be lifted upwardly while pivoting the enclosure E upon the longitudinal axis provided by the latched right hinge assembly 9r on the right side of the bed B. Conversely, selective accces to the right side of bed may be acomplished by pivoting the enclosure upon the latched left hinge assembly 9 while upwardly lifting the unlatched right enclosure side. FIG. 7 also illustrates the operative engagement of the supporting arm 35 (via slotted engaging member 38 engagement with female aperture 16 not shown) of left sidewall unit 11 with the left support unit 10 to brace the opened enclosure E for more easy access to the bed B.

FIG. 8 is a rear cross sectional view of the left hinge assembly 9 taken along line 8—8 of FIG. 6 showing the left enclosure assembly unit 10 and the left sidewall assembly unit 11 in the closed positon. As illustrated in FIG. 8, the left enclosure support assembly 10 is mounted onto the left base 39 of enclosure E via countersunk bolts 40 and nuts 41 or any other suitable securing means. A strip of resilient material 43 (e.g. rubber, plastic, cork, etc.) is advantageously placed between enclosure base 39 and the enclosure support rail 12 and another resilient strip 44 is likewise positioned between top rail 42 and sidewall rail 17. Another sealing strip 45 (enlarged for illustrative purposes) may be secured (e.g. adhesively) to the underside of the enclosure support assembly unit 10. The resilient strips (43, 44, and 45) serve to insulate and seal the enclosure against inclimate conditions, protect the equipment against weathering and abrasion as well as reducing noise levels.

FIG. 8 further depicts the enclosure support assembly unit 10 and the sidewall assembly unit 11 in the latched and secured position. The shaft connector 29, retaining member 18 of left sidewall assembly unit 10 housing shaft sub-unit 27 therein, the handle base 30 and handle projection 31 with Lynch pin 34 inserted through handle base aperture 30a and tap apertaure 33 of tap 32 with Lynch ring being positioned against the underside of Lynch pin 34 are illustrated in FIG. 6. The bracket 37 for securing supporting arm 35 along with the slotted engaging member 38 thereof are also shown.

FIG. 9 is a rear cross sectional view of the left hinge assembly 9 taken along line 8—8 depicting the left enclosure support unit 10 mounted upon the left enclosure base 39 of enclosure E and the sidewall assembly unit 11 mounted upon the top rail 42 of the left sidewall of bed B with the enclosure E being shown in the open position as depicted in FIG. 7. For illustrative purposes, the distance or opening between the sidewall assembly unit 11 and the enclosure support unit 10 has been condensed. Shaft sub-unit 27 has been withdrawn from complemental retaining member 14 with a concomitant simultaneous withdrawal of shaft sub-unit 28 from complemental retaining member 15 (not shown) so as to permit vertical clear shaft sub-units 27 and 28 (not shown) therethrough. This enables the left enclosure support assembly 10 to be lifted upwardly while axially pivoting the enclosure E upon the hinging system provided by the latched right hinge assembly 9r (not shown) as more fully illustrated by FIG. 10.

FIG. 9 shows the left assemblies in the unlatching position with shaft sub-unit 27 being withdrawn from complemental member 14 and housed within retaining member 18. A rear view of shaft connector 29 affixed to shaft sub-unit 27 along with handle base 30 and handle projection 31 are also shown. A portion of supporting arm 35 is shown extending downwardly from support rail 12 with slotted engaging member 38 (not shown) of supporting arm 35 being secured within female aperture 16 (not shown) of the support assembly rail 12. Similarily, a portion of the supporting arm 35 pivotally supported by support post 36 and extending vertically upwardly from left sidewall assembly unit 11 along with arm bracket 37 are illustrated in FIG. 9.

The shaft assembly 26 and latching assembly 24 are illustrated in the unlatched positon with the backward bracketed portion of shaft connector 29 abutting retaining member 18 as further illustrated in FIG. 1. FIG. 9 further reveals the left enclosure support rail 12 secured to the enclosure base 39 via countersunk bolt 40 and nut 41 with the interposed resilient strip 43 and a resilient strip 45 (enlarged for illustrative purposes) adhesively secured to the bottom of supporting rail 14. Resilient strip 44 resting between sidewall assembly rail 17 and the top rail 42 of bed B is also shown.

FIG. 10 is a rear cross sectional view of the right hinge assembly 9r taken along line 8—8 of FIG. 6 and shows the right hinge assembly 9r in the latched but hinged and open postion as depicted in FIG. 7. Pursuant to the illustration of FIG. 10, the unit enclosure support assembly unit 10r is secured (40 and 41) to the right base 39r of enclosure E. Similarily the right sidewall assembly unit 11r is secured (40 and 41) to the right top rail 42r of the right sidewall of bed B. The right resilient strips 43, 44, and 45 are, correspondingly to the left hinge assembly description above, interposed and/or affixed to the secured right hinge assembly 9r. Lynch pin 34r is shown in the latched position (as described with reference to FIG. 8) via insertions through the right hinge assembly counterpart apertures of right handle base 30r and tap projection 32r.

In FIG. 10, the forward bracketed portion (not shown) of shaft connector 29r rests against the right hinge assembly counterpart to left retaining member 21 (not shown) which likewise functions as a stop upon further forward movement (corresponding to the latching position) of the right shaft assembly. The cross sectional cut along line 8—8 of FIG. 6 bisects retaining member 18r of the right sidewall unit 11r which in FIG. 10 is shown as housing shaft sub-unit 27r along with the unhidden portion of shaft sub-unit connector 29r. The right shaft sub-units in conjunction with the rigidly affixed enclosure complemental retaining members and sidewall retaining members cooperatively provide a hinge upon which the secured enclosure E can axially pivot as shown in FIG. 10. Shown also in FIG. 10 are right supporting arm 35r, arm bracket 37r, slotted engaging member 38r and post projection 31r which functionally bear the same interrelationship to the right hinge assembly 9r as do the left hinge assembly 9 counterparts thereto described hereinbefore with reference to latched left assembly of FIGS. 3 and 8.

Although not illustrated by the preferred drawing embodiments of the invention herein, the shaft assembly 24 and retaining members (18-22) may alternatively be mounted onto the enclosure support assembly units with the complemental retaining members being mounted onto the sidewall assembly units.

What is claimed is:

1. A hinge adapter kit suitable for use in combination with a top enclosure having a top portion, a left enclosure sidewall extending downwardly from the top portion, a left enclosure base defining the lower edge of the downwardly extending left enclosure sidewall; a right enclosure sidewall extending downwardly from the top portion and a right enclosure base defining the lower edge of the downwardly extending right enclosure sidewall, and an open bed having a bottom bed member, a left extending bed sidewall, a right upwardly extending bed sidewall, a left bed sidewall top rail and a right bed sidewall top rail respectively defining the upper edges of said left bed sidewall and said right bed sidewall which kit, when secured to the top enclosure and the open bed, permits selective access to either side of the open bed while affording means for readily detaching or attaching the top enclosure from the open bed, said hinge adapter kit comprising a right hinge assembly and a left hinge assembly:

(a) said right hinge assembly comprising a right enclosure support rail provided with means of securing the right enclosure support rail onto the right enclosure base of the top enclosure, a right sidewall bed rail provided with means of securing the right sidewall bed rail onto the right bed sidewall top rail, at least one right complemental shaft retaining member for housing a longitudinally slidable shaft therein with said right complemental shaft retaining member being rigidly mounted upon either the right enclosure support rail or the right sidewall bed rail, at least one right shaft mounting member rigidly mounted onto the opposite right enclosure support rail or right sidewall bed rail to the mount of said right complemental shaft retaining member, with said right shaft retaining member being adapted to house and secure a longitudinally slidable shaft therein and a right slidable shaft assembly housed and secured within said right shaft mounting member, said right slidable shaft assembly comprising at least two longitudinally aligned and adjacently positioned right shaft sub-units and at least one right shaft connector rigidly interconnecting said right shaft sub-units in longitudinal alignment and providing sufficient spacial clearance between the interconnected right sub-units to permit the interconnected right sub-units to longitudinally clear the right complemental shaft retaining member when the right shaft assembly is slidably adjusted to an unlatching position and to house and retain at least one of the right interconnected shaft sub-units within said complemental shaft retaining member when the shaft assembly is slidably adjusted to a latching position;

(b) said left hinge assembly comprising a left enclosure support rail provided with means of securing the left enclosure support rail onto the left enclosure base of the top enclosure, a left sidewall bed rail provided with means of securing the left sidewall bed rail onto the left bed sidewall top rail, at least one left complemental shaft retaining member for housing a longitudinally slidable shaft therein, with said left complemental shaft retaining member being rigidly mounted upon either the left enclosure support rail or the left sidewall bed rail, at least one left shaft mounting member rigidly mounted onto the opposite left enclosure support rail or left sidewall bed rail to the mount of said left complemental shaft retaining member with said left shaft retaining member being adapted to house and to secure a longitudinally slidable shaft therein and a left slidable shaft assembly housed and secured within said left shaft mounting member, said left slidable shaft assembly comprising at least two longitudinally aligned and adjacently positioned left shaft sub-units and at least one left shaft connector rigidly interconnecting said left shaft sub-units in longitudinal alignment and providing sufficient spacial clearance between the interconnected left sub-units to permit the interconnected left sub-units to longitudinally clear the left complemental shaft retaining member when the left shaft assembly is slidably adjusted to an unlatching position and to house and retain at least one of the left interconnected shaft sub-units within said complemental shaft retaining member when the shaft assembly is slidably adjusted to a latching position, with said left hinge assembly and said right hinge assembly providing a hinge adapter kit which, when secured to said top enclosure and said open bed, permits selective access to either side of the open bed by slidably adjusting the shaft assembly to the unlatching position on the desired entry side of the open bed and thereby permit the complemental retaining member to vertically clear the spacial clearance between the interconnected shaft sub-units of the shaft assembly while maintaining the interconnected shaft sub-units of the shaft assembly on the opposite side of the open bed therefrom in the latching position and thereby allowing the top enclosure to axially pivot upon at least one of the interconnected shaft sub-units concurrently secured and housed within the complemental shaft retaining member and the shaft mounting member on the opposite side therefrom.

2. The hinge adapter kit according to claim 1 wherein the right hinge assembly and the left hinge assembly respectively have at least two complemental shaft retaining members.

3. The hinge adapter kit according to claim 2 wherein said left complemental shaft retaining member is mounted onto the left enclosure support rail and the right complemental shaft retaining member is mounted onto the right enclosure support rail.

4. The hinge adapter kit according to claim 3 wherein the right hinge assembly and the left hinge assembly are both equipped with means for stopping the longitudinally slidable hinge assembly at the latching position and at the unlatching position.

5. The hinge adapter kit according to claim 1 wherein the left shaft mounting member is mounted onto the left sidewall bed rail and the right shaft mounting member is mounted onto the right sidewall bed rail.

6. The hinge adapter kit according to claim 5 wherein the right hinge assembly and the left hinge assembly are each provided with two complemental shaft retaining members, the first complemental shaft retaining member thereof being longitudinally positioned and secured to the hinge assembly so as to provide spacial clearance for the interconnected shaft sub-units upon adjustment of the shaft assembly to the unlatching position and to house at least one of interconnected the shaft sub-units upon adjustment of the shaft assembly to the latching position and the second complemental shaft retaining member being positioned upon the hinge assembly so as to house the distal portion of at least one shaft sub-unit upon adjustment of the shaft assembly to the latching position and to provide spacial clearance for said distal portion of said shaft sub-unit upon adjustment of the shaft assembly to the unlatching position.

7. The hinge adapter kit according to claim 6 wherein the right hinge assembly and the left hinge assembly are each equipped with means for immobolizing the shaft assembly from longitudinal movement upon adjustment of the shaft assembly to the latching position.

8. The hinge adapter kit according to claim 7 wherein the left hinge assembly and the right hinge assembly are each provided with means of maintaining the top enclosure in an open position.

9. The hinge adapter kit according to claim 6 wherein the left hinge assembly and the right hinge assembly are each provided with at least two shaft mounting members which in combination with the shaft connector of said left hinge assembly and said right hinge assembly cooperatively serve as a means for respectively stopping the shaft assembly in the latching position and the unlatching position.

10. The hinge adapter kit according to claim 9 wherein the left hinge assembly and the right hinge assembly are secured to a camper top and an open bed of a pick-up truck.

11. A hinge adapter kit suitable for use in securing a top enclosure onto the sidewalls of an open bed, wherein said top enclosure comprises a top section, a left enclosure sidewall downwardly extending from the left side of said top section, a correspondingly and generally parallel right enclosure sidewall extending downwardly from the right side of said top section, a left enclosure sidewall base and a right enclosure sidewall base respectively defining the corresponding bottom edges of said left enclosure sidewall and the right enclosure sidewall and respectively permitting the top enclosure to rest upon the sidewalls of an open bed, with said open bed comprising a bottom bed member of a generally rectangular configuration, a right bed sidewall extending upwardly from the right side of the bed, a left bed sidewall extending upwardly from the left side of the bed, a right bed top rail defining the upper edge of said right bed sidewall and a left bed top rail defining the upper edge of said left bed sidewall with said right bed top rail and said left bed top rail respectively defining a generally horizontally extending plane in general parallel alignment with said right enclosure base and said left enclosure base; which hinge adapter kit, when secured to the left enclosure base and right enclosure base of the top enclosure and the left top rail and right top rail of said open bed, permits selective access to either side of the open bed while also affording means for readily detaching and attaching the top enclosure therefrom; said hinge adapter kit comprising:

(a) a right hinge assembly comprised of a right enclosure support rail adapted for securance to the right enclosure sidewall base of the top enclosure, a right bottom rail adapted for securance to the right top rail of the open bed, at least one right complemental retaining shaft member provided with an aperture for receiving and housing a longitudinally slidable shaft therein and rigidly secured onto either the right enclosure rail or the right bottom rail, at least one right shaft mounting member having an aperture for securing and housing a longitudinally slidable shaft therein and rigidly mounted onto either the right bottom rail or the right enclosure rail, with the positioning and mounting of said right shaft retaining member and said right complemental retaining member being further characterized as being oppositely mounted and positioned onto said right bottom rail and said right enclosure rail in a longitudinally offset and substantially juxtapositional alignment position so as to permit concurrent housing of a slidable shaft within the aperture of said right shaft retaining member and the aperture of said right complemental shaft retaining member, a right shaft assembly secured and housed within the aperture of said right retaining member with said right shaft assembly comprising at least two right shaft sub-units and at least one right shaft connector operatively securing adjacent right shaft sub-units of the right shaft assembly together in longitudinal alignment with said right shaft connector also providing sufficient clearance between the adjacently positioned sub-units of said right shaft assembly to permit said adjacently positioned right sub-units to longitudinally and slidably move into the aperture of said right shaft retaining member and the aperture of the right complemental retaining member, said right shaft connector also being characterized as providing sufficient clearance between the adjacently positioned right shaft sub-units to allow for the withdrawal of the right shaft sub-units from the aperture of said right complemental retaining member when said right shaft assembly is longitudinally moved to an unlatching position and a sufficient spacing between the adjacently positioned right shaft sub-units for the concurrent housing of at least one of the right shaft sub-units within the aperture of the right complemental retaining member and the aperture of the right retaining member when said right shaft assembly is longitudinally moved to a latching position;

(b) a left hinge assembly comprised of a left enclosure support rail adapted for securance to the left enclosure sidewall base of the top enclosure, a left bottom rail adapted for securance to the left top rail of the open bed, at least one left complemental retaining shaft member provided with an aperture for receiving and housing a longitudinally slidable shaft therein and rigidly secured onto either the left enclosure rail or the left bottom rail, at least one left shaft mounting member having an aperture for securing and housing a longitudinally slidable shaft therein and rigidly mounted onto either the left bottom rail or the left enclosure rail, with the positioning and mounting of said left shaft retaining member and said left complemental retaining member being further characterized as being oppositely mounted and positioned onto said left bottom rail and said left enclosure rail in a longitudinally offset and substantially juxtapositional alignment position so as to permit concurrent housing of a slidable shaft within the aperture of said left shaft retaining member and the aperture of said left complemental shaft retaining member, a left shaft assembly secured and housed within the aperture of said left retaining member with said left shaft assembly comprising at least two left shaft sub-units and at least one left shaft connector operatively securing adjacent left shaft sub-units of the left shaft assembly together in longitudinal alignment with said left shaft connector also providing sufficient clearance between the adjacently positioned sub-units of said left shaft assembly to permit said adjacently positioned left sub-units to longitudinally and slidably move into the aperture of said left shaft retaining member and the aperture of the left complemental retaining member, said left shaft connector also being characterized as providing sufficient clearance between the adjacently positioned left shaft sub-units to allow for the withdrawal of the left shaft sub-units from the aperture of said left complemental retaining member when said left shaft assembly is longitudinally moved to an unlatching position and a sufficient spacing between the adjacently positioned left shaft sub-units for the concurrent housing of at least one of the left shaft sub-units within the aperture of the left complemental retaining member and the aperture of the left retaining member when said left shaft assembly is longitudinally moved to a latching position, with said left hinge assembly and said right hinge assembly cooperatively providing a hinge adapter kit which, when secured to the corresponding left top rail and left enclosure base, and the left top rail and left enclosure base, permits selective access to either side of the open bed by slidably adjusting the shaft assembly to the unlatching position on the desired entry side of the open bed while maintaining the hinge assembly on the side of the open bed opposite therefrom in the latching position thereby affording the complemental retaining member to vertically clear and to pass through clearance between the adjacent shaft sub-units on the desired side of entry while permitting the top enclosure to axially pivot upon a hinge system formed by the shaft assembly retained and housed within the complemental retaining member and the mounting member on the side of the open bed opposite to the desired side of entry.

* * * * *